(12) United States Patent  
Minth

(10) Patent No.: US 7,267,073 B1  
(45) Date of Patent: Sep. 11, 2007

(54) WIND DIRECTION INDICATOR

(76) Inventor: Ryan Eric Minth, 27 E. 63rd St., New York, NY (US) 10021

( * ) Notice: Subject to any disclaimer, the term of this patent is extended or adjusted under 35 U.S.C. 154(b) by 0 days.

(21) Appl. No.: 11/379,571

(22) Filed: Apr. 21, 2006

(51) Int. Cl.  
*B63B 17/00* (2006.01)

(52) U.S. Cl. .............. 114/343; 73/170.01; 73/170.02; 114/90

(58) Field of Classification Search ............. 114/102.1, 114/90, 91, 343; 73/170.01, 170.02, 170.03, 73/170.05–170.15  
See application file for complete search history.

(56) References Cited

U.S. PATENT DOCUMENTS

| | | | | |
|---|---|---|---|---|
| 2,833,065 A | * | 5/1958 | Kies .......................... | 40/479 |
| 3,088,235 A | * | 5/1963 | Kies .......................... | 40/477 |
| 5,811,673 A | * | 9/1998 | Kwok et al. ............. | 73/170.05 |

* cited by examiner

*Primary Examiner*—Sherman Basinger

(57) ABSTRACT

The present invention provides a first axial support that allows of the weathervane to rotate and a second axial support that prevents the weathervane from becoming dislodged from the first axial support.

15 Claims, 6 Drawing Sheets

US 7,267,073 B1

WIND DIRECTION INDICATOR

TECHNICAL FIELD

This invention relates generally to a wind direction indicator, and more particularly, the present invention relates to a wind direction indicator that is resistant to detachment of a weathervane portion of the wind direction indicator from a remainder of the wind direction indicator.

BACKGROUND OF THE INVENTION

Conventional wind direction indicators are commonly used on vehicles, such as boats and more particularly sailboats, to determine specific weather conditions such as wind direction. Such an instrument allows a sailor to enhance performance of her boat by providing the sailor with knowledge of the current wind direction. For example, wind direction indicators allow identification of true and apparent wind, which then may be used for the purpose of allowing the sailor to adjust the boat sails and enhance performance.

Typical wind direction indicators mount to a fixed object on the boat, such as the boat hull or mast, and include a pivotal support that supports a weathervane. The weathervane then responds to wind such that it points in the direction in which the wind moves relative to the boat.

While such a device sufficiently depicts and identifies wind direction, some drawbacks exist. Specifically, the conventional construction of a wind direction indicator renders the device susceptible to detachment of the weathervane from the pivotal support or its clamp. More specifically, the weathervane is typically unsupported in an axial direction on the pivot. As such, the weathervane is susceptible of becoming unattached from the remainder of the wind direction indicator, especially in response to oftentimes chaotic flapping of sails and other equipment, especially that of other boats in close proximity. Such activities are commonly observed on sailboats. The present invention was developed in light of these and other drawbacks.

SUMMARY OF INVENTION

The present invention provides a first axial support that allows the weathervane to rotate and a second axial support limits axial movement and deters fouling to prevent the weathervane from becoming dislodged from the first axial support.

DETAILED DESCRIPTION

The present invention provides a wind direction indicator movement along more than one axial direction with respect to an axis of rotation of the weathervane portion of the wind direction indicator. More specifically, the present invention provides a first axial support that allows of the weathervane to rotate and a second axial support that limits the weathervane from moving too far in the axial direction and therefore prevents dislodgment of the weathervane from the first axial support. In this way, the weathervane is prevented from sliding upward on the first axial support or otherwise becoming dislodged from the first axial support.

Figure 1:
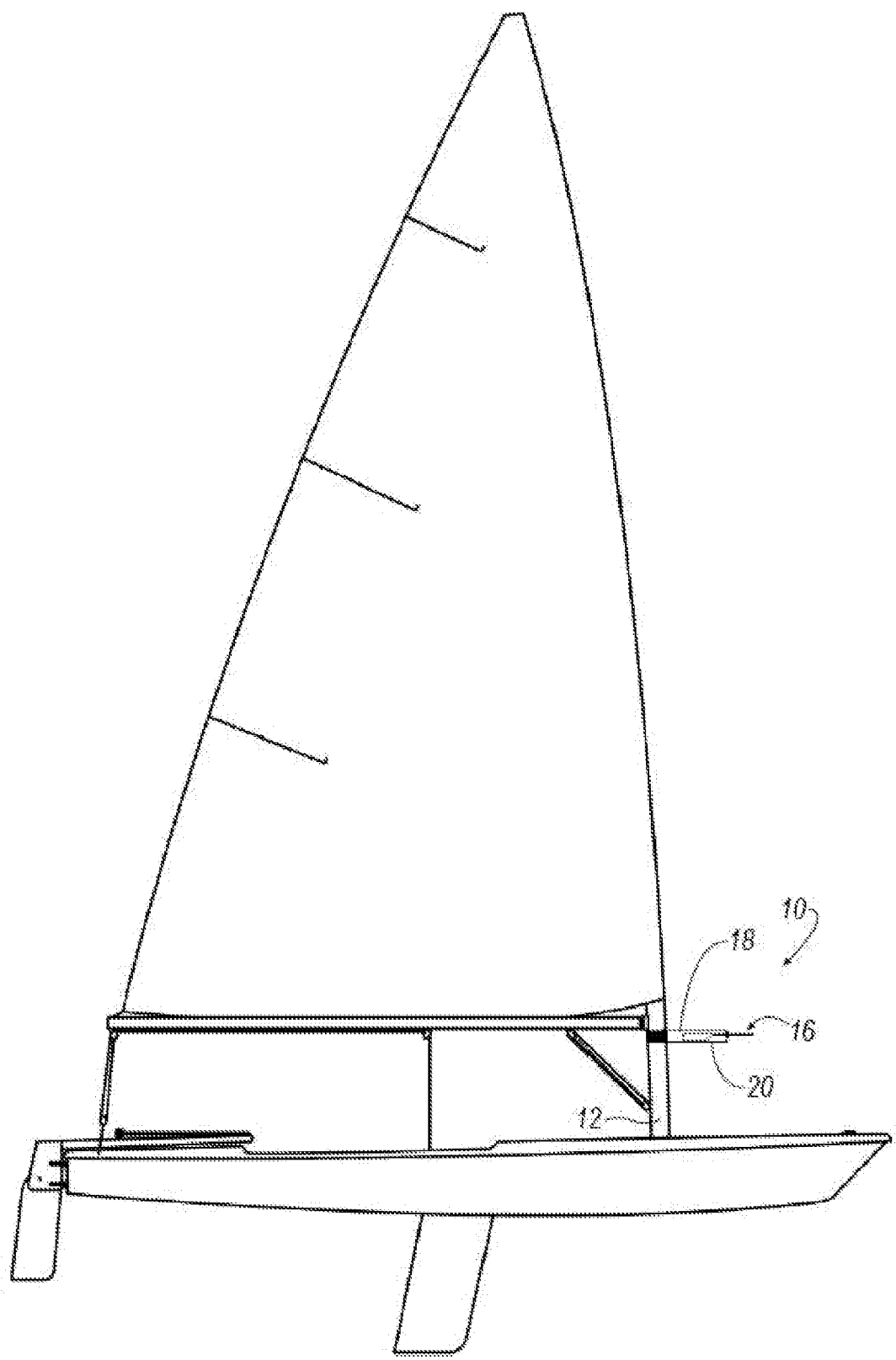
FIG. 1 is schematic view of a boat using a wind direction indicator according to an aspect of the present invention.

Referring now to FIG. 1, an embodiment of the present invention is shown and described. In FIG. 1, a wind direction indicator 10 is shown attached to a mast 12 of a boat 14. In the schematic view shown in FIG. 1, the wind direction indicator 10 generally includes a weathervane 16, upper axial support 18 and lower axial support 20. The lower axial support 20 rotatably supports the weathervane 16 on an axis of rotation generally defined by the rotation of the weathervane 16 on the lower axial support 20.

The upper axial support 18 intersects with this axis of rotation or some other upper region of the weathervane 16, thereby preventing excessive movement of the weathervane 16 away from the lower axial support 20. As such, if the weathervane 16 moves in a direction away from the lower axial support 20, threatening to become dislodged from the lower axial support 20, the upper axial support 18 is positioned to prohibit this movement and prevent the weathervane 16 from becoming dislodged from the lower axial support 20.

Although the embodiment is shown depicting the lower axial support 20 as the basis of rotation and upper axial support 18 as the mechanism for preventing dislodgment of the weathervane, it will be readily understood that upper axial support 18 may rotatably support the weathervane 16, while the lower axial support 20 is the mechanism for preventing dislodging. In an alternate embodiment, both upper axial support 18 and lower axial support 20 may simultaneously rotatably support and resist dislodgment of the weathervane 16. Additionally, although the present invention illustrates the use of the invention in conjunction with the mast of a sail boat, it will be readily understood that alternate mounting locations and alternate boats or other vehicles may be used in conjunction with the present invention.

Figure 2A:
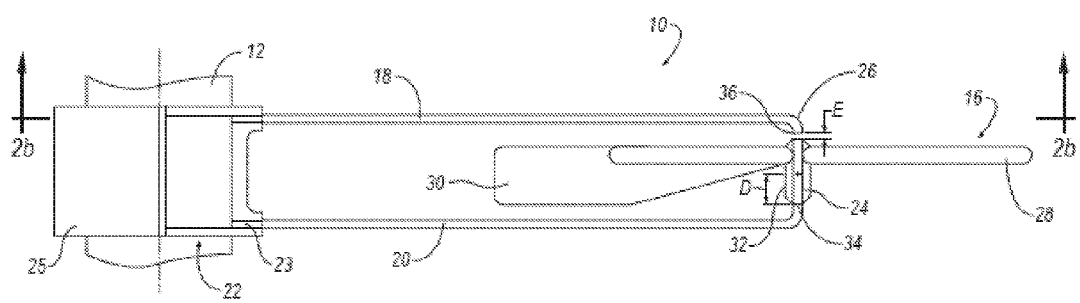
FIG. 2a is a schematic view of a wind direction indicator according to an aspect of the present invention.
Figure 2B:
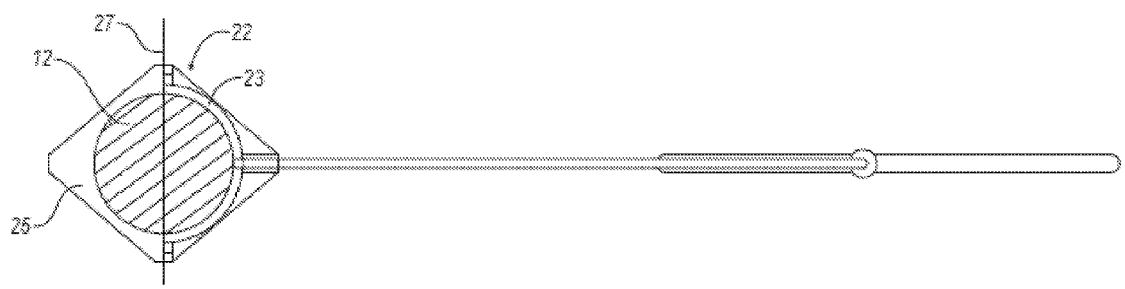
FIG. 2b is a schematic view of a wind direction indicator according to an aspect of the present invention.

Referring now to FIG. 2a, an embodiment of the present invention is shown and described. In FIG. 2a, an embodiment of a wind direction indicator 10 is shown having upper axial support 18, lower axial support 20 and weathervane 16. The upper axial support 18 and lower axial support 20 are supported by and attached to a clamp 22, which in turn attaches to the mast 12 (see FIG. 1). The clamp 22 generally includes a first portion 23 and a second portion 25 that mates at a dividing region 27. The first portion 23 is connected to the second portion 25 through bolts or other suitable fastening means to create a compression fit on the mast 12. As will be understood from FIG. 2b, this compression affixes the clamp 22 to the mast 12. The structure and operation of clamp 22 will be readily understood by one skilled in the art. It will also be readily understood that numerous alternative configurations and modifications may be used instead of the depiction of clamp 22 as shown in the figures, and the present invention is not limited by the embodiment shown and described herein.

Figure 4:
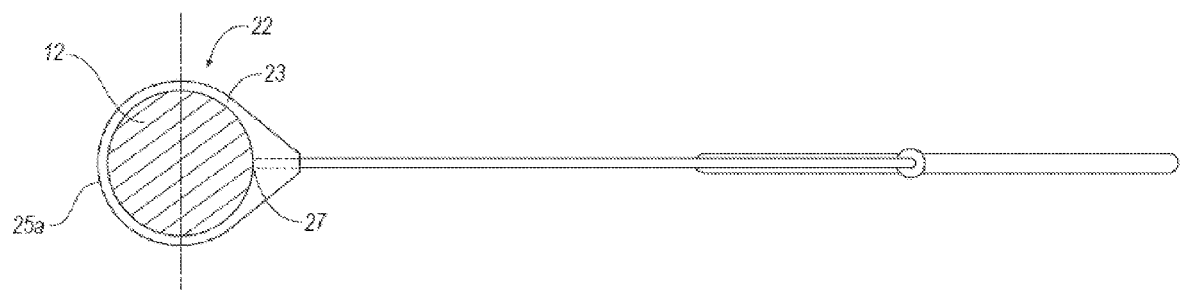
FIG. 4 is a schematic view of a wind direction indicator according to an aspect of the present invention.

In another aspect, the second portion 25 is a band, strap, tape or string that encircles approximately half of the mast's circumference. As shown in FIG. 4, second portion 25a is a strap that wraps around the mast 12 and connects at portion 27.

Referring again to FIG. 2a, the lower axial support 20 generally includes an extension of rigid material supported by and extending from the clamp 22. The lower axial support 20 extends in a generally horizontal direction with respect to the clamp 22 and then angles upward at a position distal from the clamp 22. The upward directed portion rotatably cooperates with the weathervane to form a pivot location 24 (as will be discussed in greater detail). Similarly, the upper axial support 18 is likewise constructed of a rigid material and is supported by and extends from the clamp 22. A detachment resistant portion 26 resides at a distally located portion of the upper axial support 18.

Figure 5A:
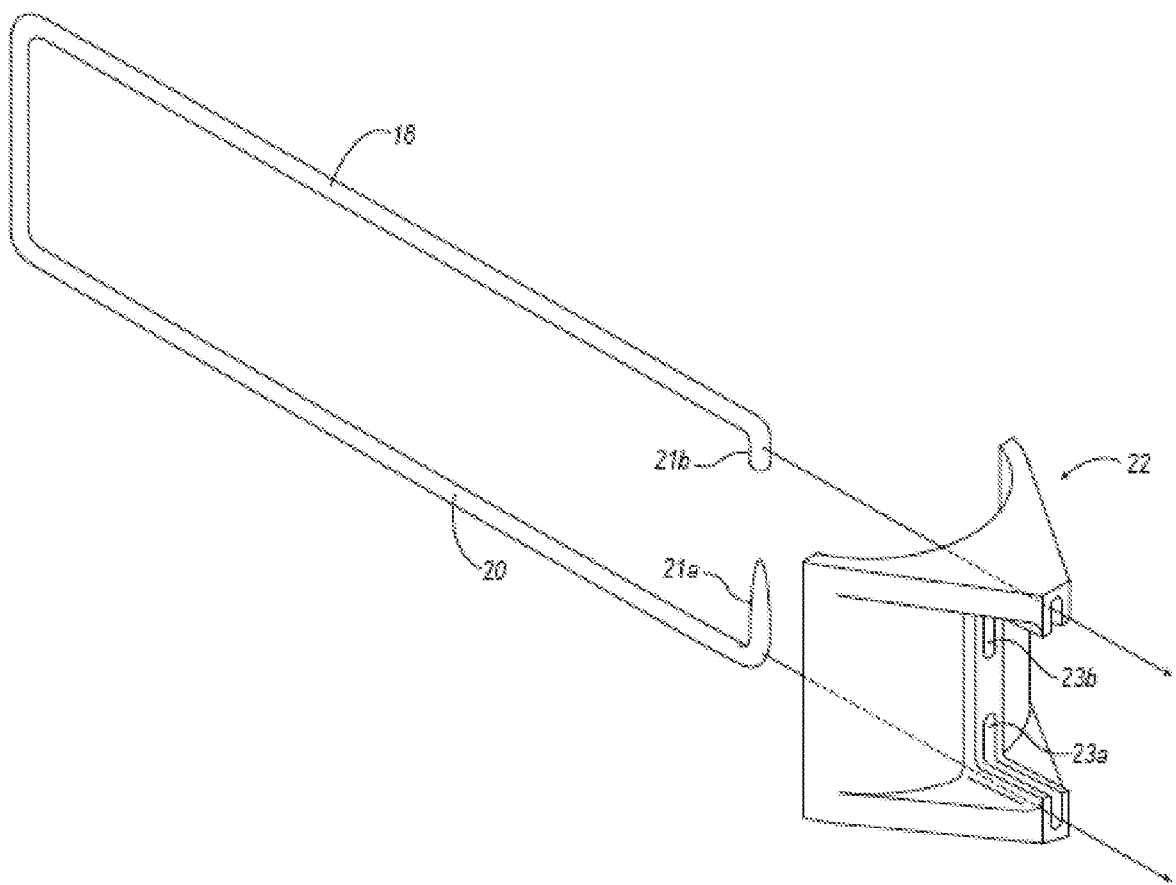
FIG. 5a is a schematic view of a wind direction indicator according to an aspect of the present invention.
Figure 5B:
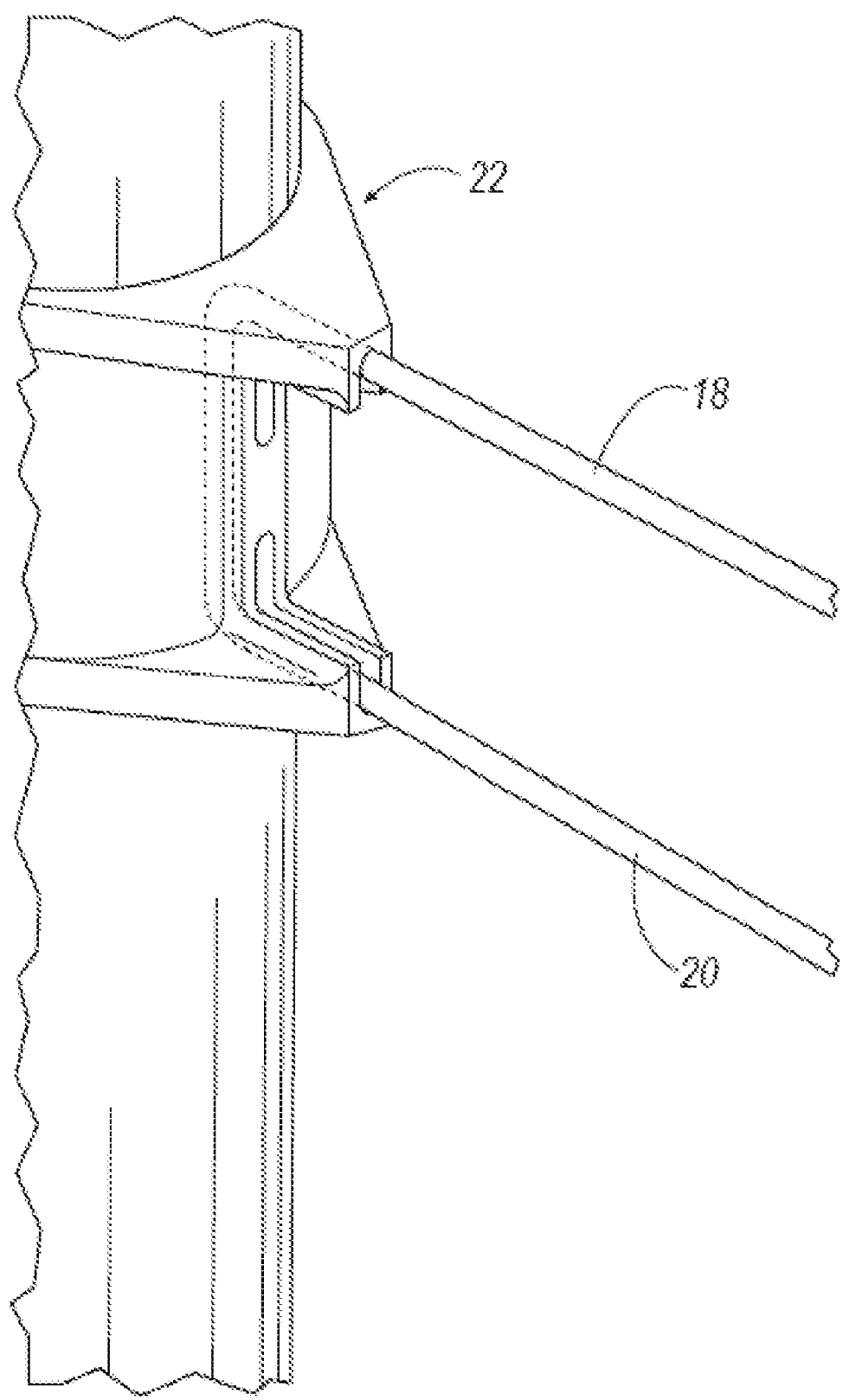
FIG. 5b is a schematic view of a wind direction indicator according to an aspect of the present invention.

As shown in FIG. 5a, the upper axial support 18 includes a vertical extension 21b while the lower axial support 20 includes a vertical extension 21a. Vertical extensions 21a and 21b cooperate with apertures 23a and 23b to connect the lower axial support 20 and the upper axial support 18 to the clamp 22.

The weathervane 16 generally includes a lower wind affected region 28 and a greater wind affected region 30 connected by a pivot 32. The lower wind affected region 28 points toward the direction of wind blow, while the greater wind affected region 30 points opposite thereto. The pivot 32, which connects both regions described above, is rotatably supported by the pivot location 24 of the lower axial support 20. In an embodiment, the pivot 32 includes an aperture 34 at a lower axial portion with respect to the figure, which encapsulates a portion of the pivot location 24 such that the pivot is able to slidably rotate about the pivot location 24. In an embodiment, the aperture 34 extends axially into the pivot 32 to a distance D, such that when the pivot location 24 resides within the aperture 34, sufficient support is provided by the pivot location 24 to the pivot 32 to allow for only minimal tilting and friction of the weathervane 16 with respect to its axis of rotation.

In an embodiment, the detachment resistant portion 26 is positioned such that a portion 36, which is a portion of the upper axial support 18 that is most proximate the pivot 32 or other upper region of the weathervane 16, is positioned no greater than a distance E away from the pivot 32. As such, one can readily see that when the distance E is at or less than the distance D, then the detachment resistant portion 26 prevents the pivot 32 and therefore the weathervane 16 from becoming dislodged from the pivot locator 24. More specifically, as long as the pivot 32 does not move upward greater than distance D, its penetration depth, at least a portion of the pivot 32 will still encapsulate a portion of the pivot locator 24.

Figure 2C:
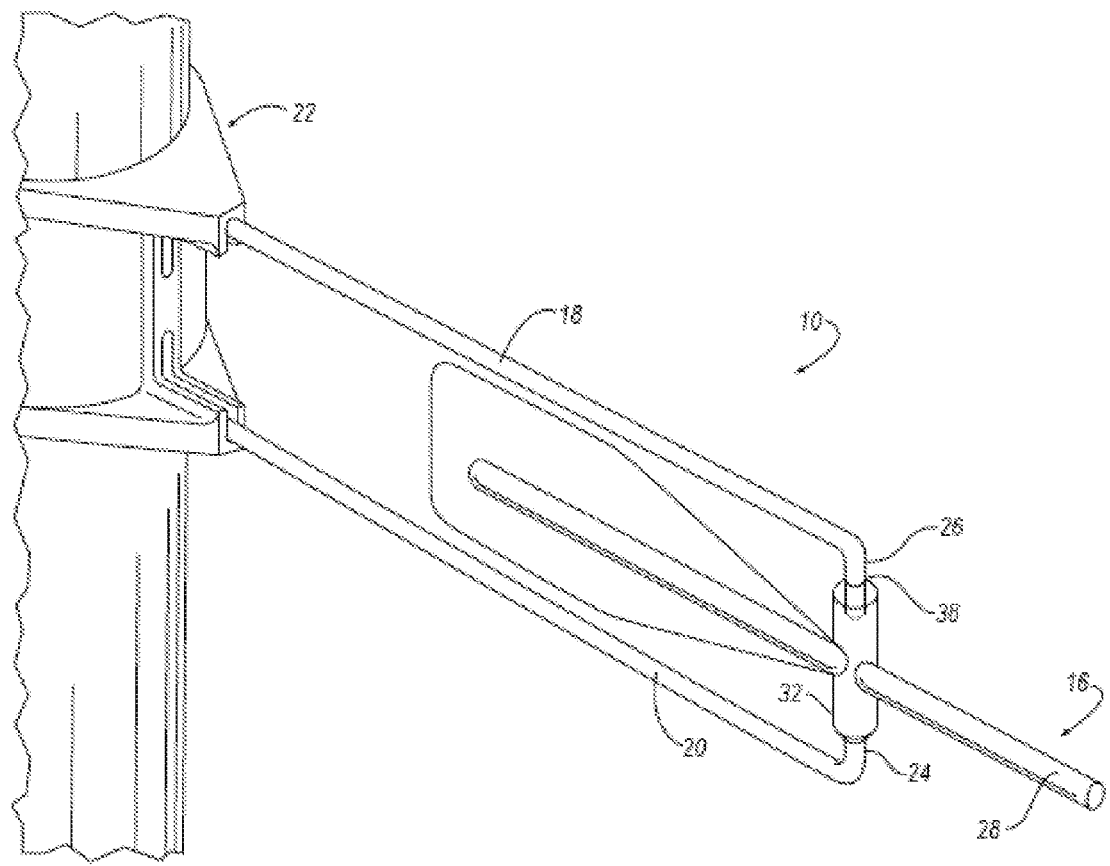
FIG. 2c is a perspective view of a wind direction indicator according to an aspect of the present invention.

Referring now to FIG. 2c, another embodiment of the wind direction indicator 10 is shown and described. In FIG. 2c, the detachment resistant portion 26 is positioned within an aperture 38 on the pivot 32. The aperture 38 is located at an upper axial position on the pivot 32, opposite to the pivot locator 24. As will be readily understood from reviewing the figure, the distance E is less than or equal >0 the distance D (see FIG. 2b) in this embodiment. As such, similar to the previous embodiments, the detachment resistant portion 26 prevents the weathervane 16 from becoming detached from the pivot locator 24.

Figure 3:
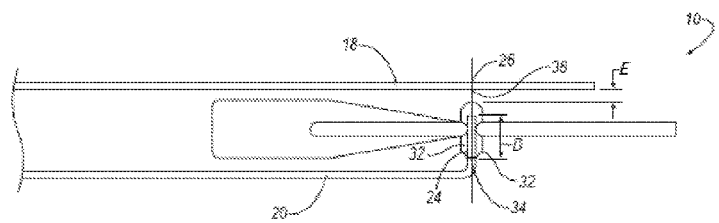
FIG. 3 is a schematic view of a wind direction indicator according to an aspect of the present invention.

Referring now to FIG. 3, another embodiment of the present invention is shown and described. The embodiment of FIG. 3 includes a detachment resistant portion 26 extending horizontally with respect to the remainder of the upper axial support 18. Similar to previous embodiments, the distance E between the uppermost surface (with respect to the figure) of the pivot 32 and the lower surface 36 of the detachment resistant portion 26 is less than the distance D (the penetration depth of the pivot locator 24 in the aperture 34 of the pivot 32).

In an alternate embodiment, the upper axial support 18 and the lower axial support 20 need not be separate elements and instead may be part of one common support. Additionally, pivot 32 does not need to be supported rotatably by encapsulating a pivot locator 24, but may instead be supported by any other known rotatable support. Also, detachment resistant portion 26 and upper axial support 18 may take numerous different configurations than those shown in the figures and described herein.

While the invention has been specifically described in connection with certain specific embodiments thereof, it is to be understood that this is by way of illustration and not of limitation, and the scope of the appended claims should be construed as broadly as the prior art will permit.

What is claimed is:

1. A wind direction indicator, comprising:
   a first axial support;
   a weathervane rotatably supported by the first axial support, said weathervane including a pivot location; and
   a second axial support having a detachment resistant portion;
   wherein the detachment resistant portion is positioned above the weathervane to prevent the weathervane from becoming dislodged from the first axial support;
   wherein the weathervane is vertically movable between the first axial support and the second axial support;
   wherein the weathervane is allowed horizontal rotational movement greater than or equal to approximately 337 degrees;
   wherein said detachment resistant portion is not in contact with the weathervane when the weathervane rests on the first axial support;
   wherein the weathervane includes a greater wind affected region and a lower wind affected region, wherein said pivot location is located between said greater wind affected region and said lower wind affected region;
   wherein rotational movement of the weathervane indicates a change in wind direction or a rotational movement of a sail boat;
   wherein the first axial support is attached to a clamp that is attached to a mast on said sail boat;
   wherein the weathervane includes an aperture at a first axial end;
   wherein the weathervane includes a second axial end that is spaced from the detachment resistant portion;
   wherein at least a portion of the first axial support is positioned in the aperture to rotatably support the weathervane on the first axial support; and
   wherein a distance D defines a depth that the first axial support penetrates the aperture from the first axial end.

2. The wind direction indicator according to claim 1, wherein:
   the weathervane and the first axial support define an axis of rotation; and
   the detachment resistant portion intersects the axis of rotation on an axial side of the weathervane opposite to the first axial support.

3. The wind direction indicator according to claim 1, wherein
the first axial support and the second axial support are constructed out of a single piece of rigid material.

4. The wind direction indicator according to claim 1, wherein:
the weathervane is allowed horizontal rotational movement greater than about 360 degrees.

5. The wind direction indicator according to claim 1, wherein the weathervane and the first axial support define an axis of rotation and
wherein the axis of rotation is not impacted by heel, pitch, and yaw.

6. The wind direction indicator according to claim 1, wherein:
a distance E defines a spacing between the detachment resistant portion and the second axial end; and
the distance E is equal to or less than the distance D.

7. The wind direction indicator according to claim 1, further comprising a clamp supporting the first axial support and the second axial support, the clamp including a top portion and a bottom portion, wherein the top portion of the clamp is higher than the first axial support and wherein the bottom portion of the clamp is lower than the second axial support.

8. The wind direction indicator according to claim 7, wherein the clamp does not fully encircle the mast.

9. The wind direction indicator according to claim 1, wherein:
the first axial support is a lower axial support; and
the second axial support is an upper axial support.

10. The wind direction indicator according to claim 1, further comprising a pivot located between said pivot location and said first axial support, wherein said pivot provides for rotational movement independent of the rotation of said weathervane.

11. The wind direction indicator according to claim 1, wherein:
the weathervane and the first axial support define an axis of rotation;
the detachment resistant portion intersects the axis of rotation on an axial side of the weathervane opposite to the first axial support; and
the weathervane is allowed horizontal rotational movement greater than or equal to 360 degrees.

12. The wind direction indicator according to claim 11, wherein:
the weathervane includes a pivot;
the pivot has a first axial portion proximate the first axial support; and
the pivot has a second axial portion proximate the detachment resistant portion.

13. The wind direction indicator according to claim 12, wherein:
the pivot has an aperture at the second axial portion; and
at least a portion of the detachment resistant portion is positioned in the aperture.

14. A wind direction indicator, comprising:
a first axial support means for supporting a weathervane;
a second axial support means for preventing the weathervane from becoming dislodged from the first axial support means;
wherein said wind direction indicator provides for rotating the weathervane on the first axial support means; and
wherein said wind direction indicator provides for sliding between the first axial support means and the second axial support means
wherein the weathervane include a pivot means;
wherein said pivot means has a first axial end proximate the first axial support means;
wherein said pivot means has a second axial end proximate a detachment resistant portion;
wherein the pivot is vertically slidable between the first axial support means and the detachment resistant portion;
wherein the pivot means does not touch the second axial support means;
wherein the weathervane includes an aperture at the first axial end;
wherein at least a portion of the first axial support means is positioned in the aperture to rotatably support the weathervane on the first axial support means; and
wherein a distance D defines a depth that the first axial support means penetrates the aperture from the first axial end.

15. The wind direction indicator of claim 14, wherein the weathervane allows for rotating beyond 360 degrees;
wherein a distance E defines a spacing between the detachment resistant portion
and the second axial end; and
wherein the distance E is equal to or less than the distance D.

* * * * *